March 25, 1958 P. M. STIVENDER 2,827,884
TIMED ACTUATOR MECHANISM
Filed July 19, 1954 2 Sheets-Sheet 2

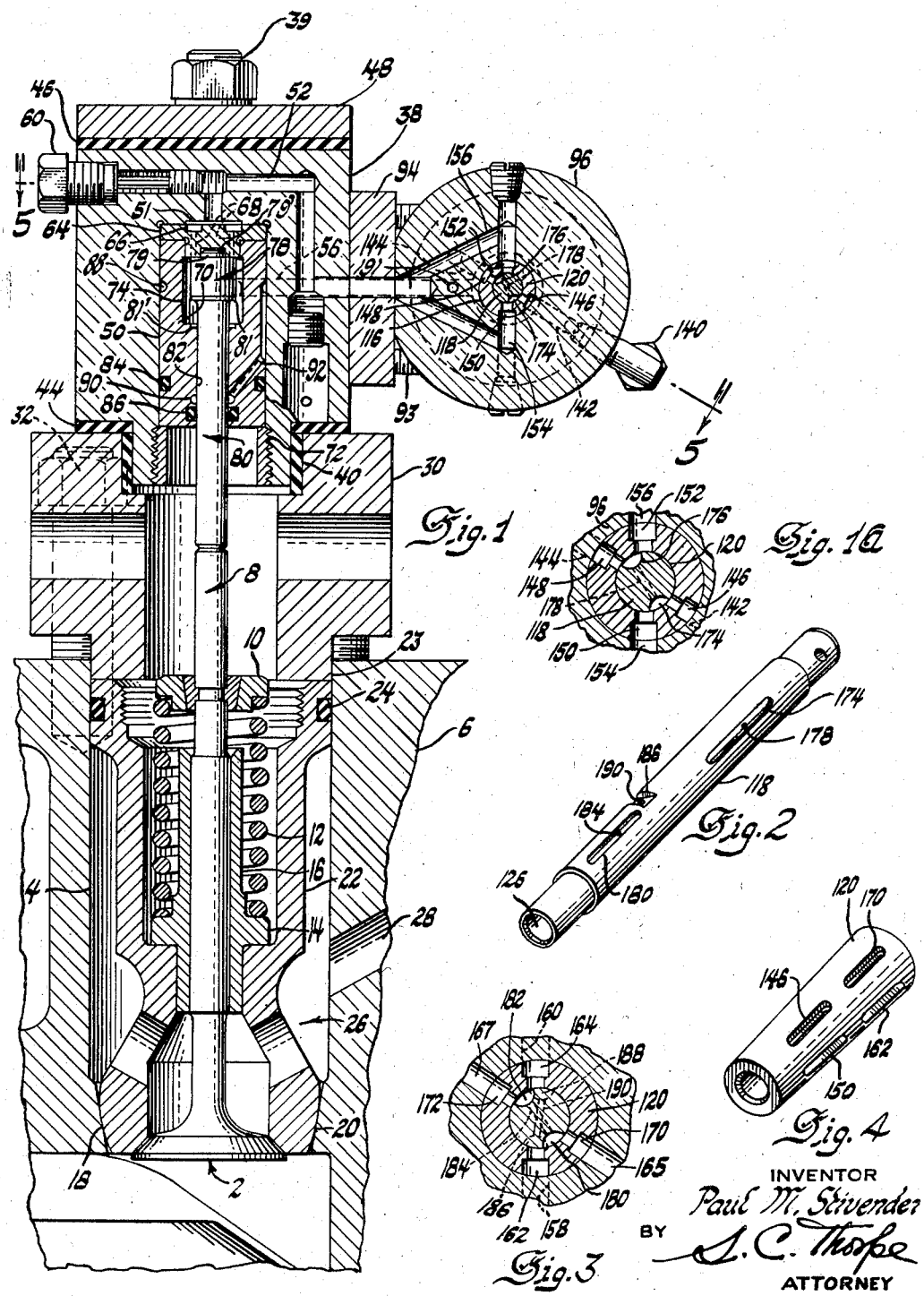

INVENTOR.
Paul M. Stivender
BY
S. C. Thorpe
ATTORNEY

United States Patent Office 2,827,884
Patented Mar. 25, 1958

2,827,884

TIMED ACTUATOR MECHANISM

Paul M. Stivender, South Euclid, Ohio, assignor to General Motors Corporation, Detroit, Mich., a corporation of Delaware Application July 19, 1954, Serial No. 444,044

20 Claims. (Cl. 123—90)

This invention relates generally to fluid actuating mechanisms and particularly to a timed fluid actuating mechanism.

The primary object of this invention is to provide a fluid actuating mechanism which is synchronized to the operation of a controlling device.

A further object of this invention is to provide such a fluid actuating mechanism with an improved valve means for controlling the flow of pressure fluid to and from an actuator cylinder.

A further and more specific object of the invention is to provide such a fluid actuating mechanism with a control valve which is easily and readily adjustable to control the timing of the actuating mechanism.

In general, these objects are attained in the embodiment of the invention to be described herein by providing such a fluid actuating mechanism with a rotary valve driven by and adjustably connected to a synchronous motor which is, in turn, driven by a controlling device; the valve having fluid supply pressure passages and primary and secondary fluid exhaust passages controlling the application of operating fluid pressure to an actuator in timed relation to the operation of the controlling device.

These and other objects of the invention will become apparent by reference to the following detailed description and the accompanying drawings illustrating one form of the invention which is particularly adapted to the hydraulic operation of a valve for an internal combustion engine in timed relation to the rotation of the engine crankshaft; such valve operation being of particular advantage in relatively large two-cycle engines in which problems of alignment, vibration transfer, and thermal expansion between the various engine parts make the use of a conventional valve operating camshaft impractical.

In the drawings:

Figure 1 is a sectional view through a portion of an engine cylinder with a typical application of fluid actuator mechanism of this invention arranged to operate a poppet valve in the cylinder head, the plane of the section being substantially represented by the line 1—1 of Figure 5.

Figure 1a is an enlarged sectional view of control valve mechanism as shown in Figure 1.

Figure 2 is a perspective view of the rotary valve of the device.

Figure 3 is a sectional view of the rotary valve substantially on the line 3—3 of Figure 5.

Figure 4 is a perspective view of the sleeve bushing for the rotary valve.

Figure 5:
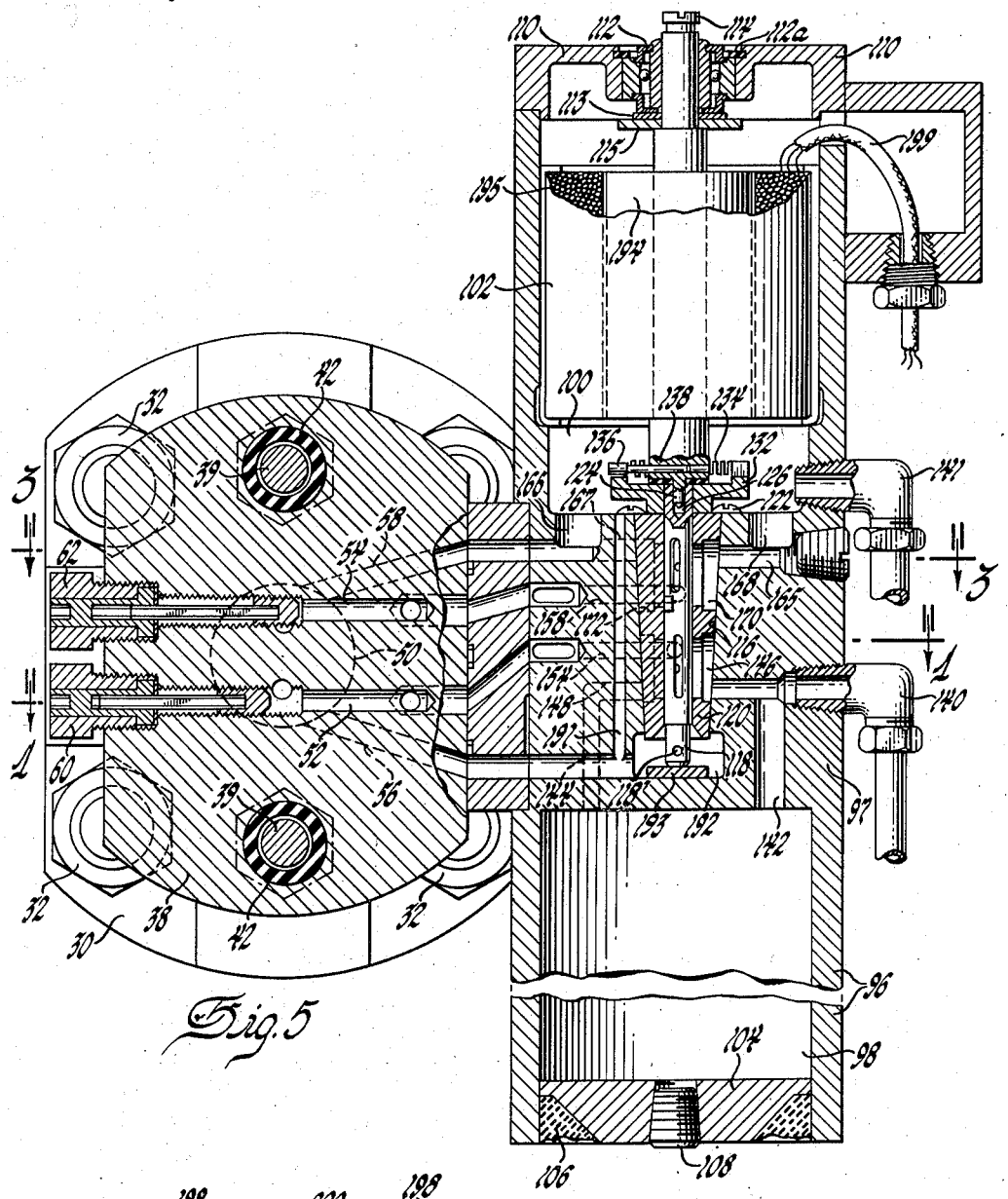
Figure 5 is a sectional view of the device taken substantially on the line 5—5 of Figure 1.

Referring more particularly to the drawings, Figure 1 shows a timed fluid actuator mechanism constructed in accordance with the invention which, by way of example, serves to operate the gas valve of a two-cycle gas engine. The gas valve is shown mounted on a bore 4 formed in the head 6 of the engine and comprises the valve 2 with a reduced stem portion 8 having a washer 10 mounted thereon which forms one seat for the valve spring 12. The other end of the spring 12 is seated against an annular shoulder 14 formed on the valve stem guide bearing 16 and which also serves as an abutment against the valve seat member 22 which supports the lower portion of the valve stem bearing 16.

The bore 4 immediately adjacent its opening into the engine cylinder is provided with an inwardly inclined shoulder 18 against which the axially curved end portion 20 of the valve seat member 22 is maintained in wedging relation. The opposite end 23 of the valve seat member 22 is enlarged into contact with the bore 4 and is sealed therewith by an annular sealing ring 24. Intermediate its ends the valve seat member 22, in conjunction with the bore 4, forms a gas receiving chamber 26 which is connected to the engine gas manifold by a duct 28 which is shown formed in the cylinder head. The valve seat member 22 is maintained in wedging relation against the shoulder 18 by the member 30 which is secured to the engine head 6 by stud bolts and nuts as shown at 32. The member 30 serves as a mounting for the actuator mechanism.

As shown in Figures 1 and 5, the actuator mechanism includes a casing 38 which is bolted to the mounting member 30 as shown at 39 and may be insulated therefrom by means of the resilient bushings 40 and 42, the resilient washers 44 and 46, and the cap plate 48. The casing 38 is provided with an axially extending bore 50 therein which is closed at one end. Passages 52 and 54 open into a counterbore 51 formed in the closed end of the bore 50 and passages 56 and 58 open on opposite sides of said bore intermediate its ends. The passages 52 and 54 are provided with needle valves 60 and 62, respectively for the purpose of adjusting the stroke of the actuator as explained in detail below.

A cylinder head washer 64 is located adjacent the closed end of the bore 50 and has an annular groove 66 registering with the counterbore 51. A cylinder member 70 is maintained in abutting relation with the head member 64 within the bore 50 by the annular retaining nut 72. The cylinder member 70 has an actuator chamber 74 adjacent its head end which communicates through a plurality of passages 68 formed in the head washer 64 with the fluid receiving space formed by the counterbore 51 and the annular groove 66. A plunger 78 located in the actuator chamber 74 has a reduced diameter portion 80 slidably mounted in the axially extending bore 82 in the end of the cylinder member 70 opposite the actuator chamber 74 and engaging the end of the valve stem 8 during valve operating movement of the plunger 78. The plunger has been provided with an enlarged head portion to provide for upper and lower male cushioning dash pot portions 79 and 81, respectively which coact with female dash pot portions 79' and 81' formed in the respective ends of the actuator chamber 74. Clearance is provided between the plunger 80 and the valve stem 8 sufficient to accommodate thermal expansion of the parts and to provide additional clearance at normal operating temperatures permitting the poppet valve 2 to close tight against its valve seat 22 without pressure from the cushioning effect of the dash pot portions 79 and 79' which might otherwise hold the valve slightly open burning the valve seat.

The actuator mechanism is effectively sealed by lapping the mating surfaces of the bore 50, the cylinder member 70, the plunger 78 and the head washer 64 to very fine tolerances. This will restrict all but minor leakage even at very high pressures. Such minor leakage as may occur between the cylinder member 70 and the bore 50 and between the piston rod 80 and the bore 82 is prevented by sealing rings 84 and 86 and annular drain grooves 88 and 90, formed in the cylinder member 70 and interconnected by passageway 92, which carry any such minor leakage to the drain passages 56 and 58.

A rotary control valve mechanism for the fluid actuator is mounted on the side of the actuator casing 38 by means of bolts 93 and an adaptor plate 94 which, as shown in Figure 5, provides extensions of the passages 52, 54, 56, and 58 connecting to various passages in the control valve mechanism. The passages in the adaptor plate 94 are drilled symmetrical with respect to the passages in the actuator casing 38 permitting either the actuator or the control valve mechanism to be turned over relative to the other. In this connection it is to be noted that Figure 5 shows the control valve mechanism in its preferred operating position as explained in detail below.

The control valve mechanism includes a valve casing 96 which, in addition to housing a rotaray actuator control valve, also provides a fluid pressure accumulator or surge chamber 98 formed in one end thereof and a fluid expansion and deceleration discharge sump chamber 100 formed in the opposite end thereof. Intermediate the two fluid chambers 98 and 100 the control valve casing 96 has a substantially solid center portion 97 provided with a tapered axially extending bore 116 opening into the sump chamber and a number of fluid passages as described below. The accumulator chamber 98 has an end cap 104 welded to the side walls of the casing as shown at 106 and provided with a drain plug 108. The accumulator chamber is of sufficient volume and side wall elasticity to accommodate the surging caused by variations in supply pressure and the opening and closing of the rotary control valve. A fluid pressure line 140 is connected to the accumulator chamber 98 by the inlet passage 142 formed in the center portion of the casing.

The discharge sump chamber 100 also serves as a housing for the valve-driving synchronous motor 102 and is closed at its end by end cap 110 which is removably secured to the chamber side walls. An anti-friction type bearing 112 is provided in the end cap 110 for journaling one end of the synchronous motor shaft 114 and is retained in place by a split ring 112a. The opposite end of the shaft 114 is carried by the rotary valve member 118 which is journaled in a tapered valve bushing 120 which is non-rotatably keyed within the bore 116 by the screws 122. The motor shaft 114 is maintained in its correct axial position by one or more shim washers as shown at 113 and stop washer 115 limiting the axial travel of the motor armature 194 when changing the timing of the actuator mechanism. Fluid collected in the sump 100 is discharged through a conduit 141 connected thereto.

The connection between the shaft 114 and the valve member 118 comprises an axially extending pin 124 formed on the end of the shaft 114 which fits into an axially extending bore 126 formed in the end of the valve member 118. A crown wheel or collar 132 is secured adjacent the end of the rotaray valve member and is provided with a number of axially extending radial slots 134. A pin 136 is carried by a transverse hole 138 adjacent the end of the shaft 114 and coacts with the slots 134 to provide an adjustable driving connection between the motor shaft and the valve member.

The valve bushing 120, as shown by Figures 1, 4, and 5, has two pairs of diametrically opposed longitudinally extending radial slots or ports formed in each end thereof. Two of the diametrically opposed slots 146 and 148 adjacent the small end of the valve bushing 120 constitute inlets to the valve and are connected to the accumulator chamber by the passage 142 and a second inlet passage 144, respectively, which are formed in the valve casing. The other two diametrically opposed slots 150 and 152 at the small end of the bushing are formed at an acute angle to the inlet slots 146 and 148 and constitute pressure delivery outlets for the valve. The slots 150 and 152 are connected to and deliver pressure fluid to the actuator cylinder by two passages 154 and 156 formed in the valve casing which converge to connect with the actuator passage 52.

Two fluid exhaust passages 158 and 160 in the valve casing are similar to the pressure delivery passages 154 and 156 and converge to connect the fluid exhaust passage 54 of the actuator to two of the diametrically opposed slots 162 and 164 which are aligned axially of slots 150 and 152 adjacent the large end of the tapered bushing. Passages 165 and 167 interconnect two counterbores 166 and 168 opening into sump chamber 100 to the other two diametrically opposed slots 170 and 172, respectively, which are aligned axially of slots 146 and 148 adjacent the large end of the bushing. The two counterbores 166 and 168 serve as initial expansion and deceleration chambers for the fluid prior to discharge into the main sump chamber 100.

A pair of longitudinally extending grooves or ports disposed 180° of each other adjacent each end of the valve member 118 and a pair of similarly disposed slots or ports intermediate the longitudinally extending grooves are circumferentially offset from each other and are of sufficient width to form timed fluid connections between the paired slots of the bushing 120 as the valve member 118 is driven by the synchronous motor 102. The grooves 174 and 176 serve to connect the pressure delivered slots 150 and 152 with the valve inlet slots 146 and 148 and are interconnected by a diametrical passage 178 to insure a balance of fluid pressure on opposite sides of the valve member. Grooves 180 and 182 serve to connect the exhaust slots 162 and 164 with the fluid discharge slots 170 and 172 and are interconnected by a diametrical passage 184 to insure balanced pressure on opposite sides of the valve member. The slotted ports 186 and 188 formed intermediate the end grooves of the valve member 118 also serve to connect the exhaust slots 162 and 164 with the fluid discharge slots 170 and 172 as explained below and are interconnected by a diametrical passage 190 to insure balanced pressure on opposite sides of the valve member.

The lower end of the valve spindle 118 extends into a chamber 192 and is supported by a hardened thrust plate 193 which supports all of the rotating parts including the synchronous motor rotor 194 which rests on the spindle 118. The chamber 192 is directly connected to the sump chamber by a passage 191 and by an additional roundabout passage through the passages 56 and 58 and the groove 88. The mating surfaces of the axial bore 116, the bushing 120, and the valve spindle 118 are lapped to provide a seal effective to limit leakage between the members. Such minor leakage as occurs will be returned either directly to the sump or from the chamber 192 by way of the passage 191. The leakage between the spindle and the bushing serves to lubricate the rotary spindle within the bushing.

The synchronous motor 102 provided for driving the rotary control valve 118 is preferably of a type having a permanent four-pole magnet rotor 194. It has been found that satisfactory rotors of this type may be formed of such commercially available magnetic materials as Alnico V or VI. By magnetizing rotors of these materials during heat treatment at approximately 1600° F., the pole positions and magnetic channels through the rotor are permanently fixed in the material. The positioning of the pin 136 is always centered on one of the north poles of the rotor. Since the pole positions and magnetic channels are permanently fixed in the material, appreciable loss in valve timing will not occur due to changing of the pole's positions angularly to the pin 136 even though the rotor is subjected to a loss of magnetism through some abnormal demagnetizing action.

Figure 6:
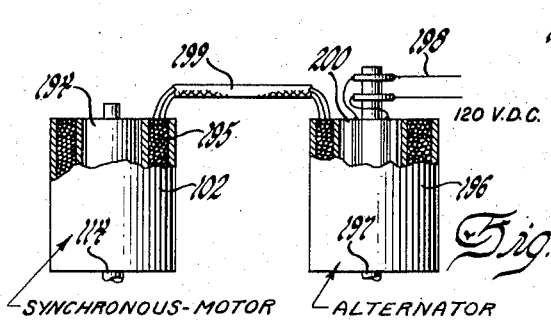
Figure 6 is a diagrammatic view of the alternator and synchronous motor and their connections.

The stator 195 of the synchronous motor 102, as shown diagrammatically in Figure 6, is electrically connected to and driven by a two-pole alternator 196 whose rotor 200 is secured to an engine-driven shaft 197. The shaft 197 operatively forms or may actually be an extension due to the integral sump chamber located therein is as shown in Figure 5. However, during tests of the valve actuating mechanism shown it has been found that the valve housing may be inclined at an angle of 45° from the vertical if the side having the drain 141 is raised to thereby maintain a head of oil over the velocity reducing chambers 166 and 168 permitting deaeration of the actuator fluid before its return to the pump supply tank. It will of course be understood that relocation or use of a different type of decelerating and expansion means will permit reorientation of the other elements of the mechanism. It should also be noted that at the pressures used, a certain amount of air may also be dissolved in the oil under pressure. As the oil is released from pressure at the exhaust, this air flashes out of solution in the form of very fine bubbles or additional foam. These bubbles rise to the surface rather rapidly and the resultant deaerated oil flows through drain 141. This means that there is more air-oil volume coming into chamber 100 per minute than oil going out drain 141. Oil with air in solution is of negligible greater volume than oil without dissolved air, but oil with air thrown out of solution in the form of small bubbles is a greater volume. This will build up pressure in the chamber 100 and cause leakage out through the anti-friction bearing 112 on shaft 114 if means is not otherwise provided for releasing the air from the chamber. To overcome this difficulty the drain line 141 is sloped to a main drain header, not shown, so that the oil stream lays in the bottom of the drain line and permits an unbroken air path above the oil stream from chamber 100 all the way to the main drain header. The main drain header is vented out to the room.

A further advantage in having an unobstructed air path from chamber 100 to the room air is that pulsations due to sudden pulses in oil volume can be relieved through the upper part of the drain line and do not subject the bearing 112 to pulsating pressure causing oil loss at this point. Any vent to the outside room air from chamber 100 as through the bearing 112 will carry considerable oil mist due to pulsating effects in this chamber. The air path through the drain system is therefore preferred.

The foregoing description of the invention is explanatory thereof and various changes in the size, shape and materials as well as in the details of the illustrated construction may be made within the scope of the appended claims without departing from the spirit of the invention.

I claim:

1. In a fluid pressure actuating device, a poppet valve, a cylinder having a plunger reciprocably mounted therein, said plunger being operatively connected to said poppet valve, fluid inlet and outlet passages connected to one end of said cylinder, and valve means for sequentially introducing pressure fluid to said cylinder through said inlet passage and relieving pressure in said cylinder through said outlet passage thereby causing said poppet valve operating plunger to reciprocate, said valve means comprising an engine driven alternator, a synchronous motor electrically driven by said alternator and a valve driven by said synchronous motor and controlling the flow of fluid through said passages.

2. In a fluid actuator mechanism, an alternator adapted to be drivingly connected to an engine, a synchronous motor electrically connected to and driven by said alternator, a fluid actuator cylinder having a plunger reciprocably mounted therein, said cylinder having a pressure delivery and an exhaust passage connected to one end thereof, a source of high pressure fluid, a discharge chamber, said delivery and exhaust passages having valve means driven by said synchronous motor to sequentially connect the delivery passage with said pressure source and the exhaust passage to said discharge chamber.

3. An actuator mechanism comprising an alternator adapted to be driven by a prime mover, a synchronous motor electrically connected to and driven by said alternator, a fluid actuator cylinder having a plunger reciprocably mounted therein, said cylinder having a pressure delivery passage and an exhaust passage connected to one end thereof, said delivery passage being connectable to a source of pressure fluid, said exhaust passage being connectable to a discharge chamber, said delivery and exhaust passages having balanced rotary valve means driven by said synchronous motor for sequentially connecting the delivery passage with said pressure source and the exhaust passage to said discharge chamber.

4. An actuator mechanism comprising an alternator adapted to be driven by a prime mover, a synchronous motor electrically connected to and driven by said alternator, a fluid actuator cylinder having a plunger reciprocably mounted therein, said cylinder having a pressure delivery and an exhaust passage connected thereto, said delivery passage being connectable to a source of pressure fluid, said exhaust passage being connectable to a discharge chamber and said delivery and exhaust passages having balanced rotary valve means connected to and adapted to be driven by said synchronous motor for sequentially connecting the delivery passage with said pressure source and the exhaust passage to said discharge chamber thereby causing said plunger to reciprocate in said cylinder, said valve means comprising a casing having a tapered bore therein, a bushing mounted in said bore, said bushing having two pairs of diametrically opposed longitudinally extending radial slots formed adjacent each end thereof, a first pair of said slots at one end being in communication with said delivery passage, the second pair of said slots at said one end being connected to said pressure source, a third pair of said slots at the opposite end of said bushing being in communication with said exhaust passage, and a fourth pair of slots at said opposite end being connected to said discharge chamber, and a valve member rotatably mounted in said bushing and drivingly connected to said synchronous motor, said valve member having a pair of oppositely disposed longitudinally extending grooves formed in each end thereof, said pairs of grooves being circumferentially offset from each other and said grooves being of sufficient width to form timed fluid connections between the paired slots of said bushing as the valve member is driven by said synchronous motor.

5. A timed valve mechanism for a fluid actuator comprising a casing, said casing having an accumulator chamber formed in one end thereof and a discharge chamber formed in the opposite end thereof, a synchronous motor mounted in said discharge chamber, a bore extending axially of said casing intermediate said chambers, a cylindrical bushing mounted in said bore, said bushing having two pairs of diametrically opposed longitudinally extending radial slots formed adjacent the opposite ends thereof, a fluid pressure source connected to said accumulator chamber, inlet passages connecting the accumulator to two of the diametrically opposed slots adjacent one end of the bushing, pressure delivery passages connecting said fluid actuator to the other diametrically opposed slots adjacent the same one end of said bushing, fluid exhaust passages connecting said fluid actuator to two of the diametrically opposed slots adjacent the opposite ends of said bushing, discharge passages connecting the other slots adjacent the opposite end of said bushing to said discharge chamber, a valve member rotatably mounted in said bushing and drivingly connected to said motor, said valve having circumferentially spaced longitudinally extending grooves formed adjacent each end thereof, said grooves being of sufficient width to form sequential fluid connections between the paired slots of said bushing as said valve member is rotated.

6. A timed valve mechanism for a fluid actuator comprising a casing, said casing having an accumulator chamber formed in one end thereof and a discharge chamber formed in the opposite end thereof, a bore extending axof the engine crank shaft. The electrical connection between the motor and the alternator is indicated at 199. The alternator is provided with direct current excitation as best shown at 198. The use of a two-pole alternator is preferable for use of the invention in an engine valve actuating mechanism; otherwise during starting, the synchronous motor driving the rotary valve may jump into step with the alternator, as usual, but out of time with the engine. The engine crank shaft will turn one revolution for each valve opening in a two-stroke cycle engine, and two revolutions for each valve opening in a four-stroke cycle engine. Consequently, the synchronous motor in a two-stroke cycle engine application may have as many pairs of poles as there are sets of axially disposed fluid delivering and discharge ports, such as 174 and 180, arranged symmetrically of the valve spindle 118 and for a four-stroke cycle engine application, the pairs of synchronous motor poles should be twice the number of such sets of ports.

In operation a pressurized fluid such as oil is supplied to the fluid-filled accumulator chamber 98 by the fluid pressure line 140 through the inlet passage 142. As the valve member 118 is rotated, the grooves 174 and 176 interconnect the passages 142 and 144 with the passages 154 and 156 through the diametrically opposed slots 146, 148, 150, and 152 formed in the small end of the valve bushing. The pressurized fluid is then delivered to the actuator chamber 74 through the pressure delivery passages, 52, 154, and 152, the fluid received space or chamber formed by the countersink 51 and the annular groove 66, and the passages 68 causing the plunger 78 to engage the valve stem 8 and to open the valve 2 against the action of the valve spring 12. After the valve 2 is opened, it is hydraulically locked open for a predetermined angle of crankshaft rotation depending on the angle of offset between the grooves 174, 176 and 180, 182 respectively. As the valve member 118 is further rotated, a connection will be made by the grooves 180 and 182 between the fluid exhaust slots 170 and 172 and the fluid discharge slots 162 and 164 formed adjacent the large end of the bushing thereby returning the fluid from the actuator cylinder 74 through the passages 54, 154, and 156, past the valve member 118 through the discharge passages 165 and 167, and into the expansion and deceleration counterbores 166 and 168 opening into the sump chamber and thus allowing the valve 2 to move towards its seat under the action of the valve spring 12. The slots 186 and 188 in the valve member provide a secondary exhaust connection to permit and insure the full return of the valve to the valve seat 22 as explained in greater detail below.

The valves 60 and 62 are adjusted at engine operating speed, preferably on an external test stand, to slow the flow of the pressure fluid to the actuator chamber 74 to insure that the rotary valve 118 will close the intake and exhaust portions of its cycle just before the plunger 78 has completed its valve opening and valve closing strokes, respectively. By such adjustment the plunger is hydraulically decelerated at each end of its stroke before it strikes either of the dash-potting cushions 79, 79' and 81, 81'. Should the plunger 78 travel too far and strike its lower cushion during its poppet valve opening stroke with the engine operating at normal speed, the stroke limiting valve 60 should be closed a little to slightly reduce the average speed of the plunger 78 thereby allowing more time for the ports 174 and 176 to close and thereby taking the deceleration forces of the poppet valve in the hydraulic system rather than in the cushion. In the case of the exhaust stroke, should the plunger overtravel during its closing movement, the stroke adjusting valve 62 should be adjusted so that the rotary valve ports or grooves 180 and 182 will close just in time to prevent the poppet valve from striking its seat. After the poppet valve is decelerated and stopped just off its seat, it is again released by the small slotted ports 186 and 188 which allows the poppet valve to complete its stroke closing tightly against its seat and eliminating any residual hydraulic pressure in the cylinder 74 which might cause poppet valve leakage and consequent burning of the poppet seat. If the stroke adjusting valve 62 in the exhaust passage 54 is closed too far, the poppet valve stroke will be reduced to the point where the release ports 186 and 188 will not pass enough oil to permit the poppet valve to seat thereby causing blow back from the engine compression and burning of the poppet valve. This same condition will also occur if the engine is run considerably over speed in that the ports 180, 182 and 186, 188 will not be opened a sufficient length of time to exhaust the actuator chamber 74. A similar condition can exist where the poppet valve will not be opened far enough if the valve 60 is closed too much or the engine is operated considerably over speed.

It is to be noted that when the engine is operating at reduced speed, the ports of the rotary valve spindle stay open longer than at the normal operating speeds for which the stroke adjusting valves are set thereby causing an overtravel of the plunger 80 by passing too great a volume of oil to the actuator chamber 74. The cushions 79, 79' and 81, 81' are therefore provided to decelerate and cushion this over-traveling tendency of the plunger 78 at reduced speeds.

The actuator mechanism assembly may be replaced on an engine by removing the two nuts 39 permitting the removal of the mechanism from the engine cylinder. This can be done while the engine is running. The connection between the shaft 114 and the valve member 118 provides a means for adjusting the timing of the control valve mechanism so that it may be used to operate the poppet valves of different cylinders on the same engine. Since the permanent magnet synchronous motor 102 is provided to revolve the control valve at one half the speed of the engine driven alternator to provide one valve actuator impulse per engine cycle, the number of slots 134 provided on the crown collar 132 should be twice the number of cylinders of a two-cycle engine on which the actuator is to be used. Prior to placing the replacement mechanism on the engine, a tool is inserted through a special plug, not shown, in the housing 96 and into a hole 118' in the low end of the rotary valve spindle 118. This holds the rotary valve spindle against rotation and serves as a reference for the valve spindle position. The expanding ring 112a holding the ball bearing 112 in place is then removed which permits the shaft 114 to be shifted axially so that the pin 136 is out of engagement with the slots 134. The shaft 114 is then rotated relative to the valve spindle 118 to modify the timing of the control valve. The motor housing cap 110 is stamped to indicate the proper valve seating for each cylinder of the engine and when the proper adjustment has been made, the shaft 114 can be shifted axially in the opposite direction again bringing the pin 136 into contact with the grooves 134.

Hydraulic actuator fluids, such as oil, at the pressures necessary to operate such an actuator mechanism would foam if permitted to discharge into air at a high jet velocity. The foam would then be returned to the high pressure system through the pump tank and supply pump which would only increase the foaming tendency as the oil expanded through the exhaust ports of the rotary valve. It has therefore been found necessary to provide the expansion and decelerating chambers 166 and 168 for the exhausting actuator fluid which discharges into a head of oil within the motor housing; the level or height of the overflow 141 above the expansion and decelerating chambers 166 and 168 controls the head of oil into which they discharge. The necessary head for proper deaeration of the oil before its return to the pump tank is dependent upon the viscosity and foaming tendency of the actuator fluid to be used. As stated above the preferred operating position of the control valve mechanism ially of said casing intermediate said chambers, a cylindrical bushing mounted in said bore, said bushing having two pairs of diametrically opposed longitudinally extending radial slots formed adjacent the opposite ends thereof, a fluid pressure source connected to said accumulator chamber, inlet passages connecting the accumulator to two of the diametrically opposed slots adjacent one end of the bushing, pressure delivery passages connecting said fluid actuator to the other diametrically opposed slots adjacent the same one end of said bushing, fluid exhaust passages connecting said fluid actuator to two of the diametrically opposed slots adjacent the opposite ends of said bushing, discharge passages connecting the other slots at the opposite end of said bushing to said discharge chamber, and a valve member rotatably mounted in said bushing and having a pair of oppositely disposed longitudinally extending grooves formed adjacent each end thereof, said pairs being circumferentially offset from each other and said grooves being of sufficient width to form a fluid connection between the paired slots of said bushing.

7. A valve mechanism for a fluid actuator comprising a casing having a bore therein, a sleeve mounted in said bore, said sleeve having a plurality of paired longitudinally extending radial slots formed therein in angularly disposed side-by-side relation, an inlet passage in said casing communicating with one slot of each pair, an outlet passage in said casing communicating with the other slot of each of said pairs, and a valve member rotatably mounted in said sleeve, said valve member having longitudinally extending grooves formed therein of sufficient width to form a fluid connection between the paired slots of said bushing.

8. A valve mechanism comprising a casing having a bore therein, a cylindrical bushing mounted in said bore, said bushing having a pair of angularly disposed longitudinally extending radial slots formed therein in parallel side-by-side relation, an inlet passage in said casing communicating with one of said slots, an outlet passage in said casing communicating with the other of said slots and a valve member rotatably mounted in said bushing, said valve member having a longitudinally extending groove formed therein of sufficient width to provide a fluid connection between the paired slots of said bushing.

9. In a fluid actuator mechanism, an alternator adapted to be drivingly connected to a prime mover, a synchronous motor electrically connected to and driven by said alternator, a fluid actuator cylinder having a plunger reciprocably mounted therein, said cylinder having a pressure delivery and an exhaust passage connected to one end thereof, a source of high pressure fluid, a discharge chamber, and valve means comprising a balanced rotary valve driven by said synchronous motor to sequentially connect the delivery passage with said pressure source and the exhaust passage to said discharge chamber.

10. An actuator mechanism comprising an alternator adapted to be driven by a prime mover, a synchronous motor electrically connected to and driven by said alternator, a fluid actuator cylinder having a plunger reciprocably mounted therein, said cylinder having a pressure delivery and an exhaust passage connected to one end thereof, said delivery passage being connectable to a source of pressure fluid, said exhaust passage being connectable to a discharge chamber, valve means driven by said synchronous motor for sequentially connecting said delivery passage with said pressure source and said exhaust passage to said discharge chamber.

11. In a valve mechanism a casing, a motor in said casing, said motor having a rotary shaft, said casing having a bearing for said rotary shaft at one end, a valve bore in said casing opposite said bearing, a cylindrical bushing mounted in said bore, said bushing having a pair of slots formed therein, an inlet passage in said casing communicating with one of said slots, an outlet passage in said casing communicating with the other of said slots, and an extension of the rotary shaft of said motor being journaled in said bushing, said extension constituting a valve member having a longitudinally extending groove formed therein of sufficient width to provide a timed fluid connection between the paired slots of said bushing as said rotary shaft is turned by said motor.

12. A fluid actuator mechanism comprising a casing, said casing having a bore therein closed at one end, a cylinder head abutting the closed end of said bore, said cylinder head having fluid passages therein, an actuator cylinder member secured in said bore and maintaining said head in abutting relation to the closed end of the bore, said actuator cylinder having a plunger reciprocably mounted therein, said casing having an inlet and an outlet passage connected to the closed end of said casing bore and communicating with said head passages, said inlet passage being connectable to a source of pressure fluid, said outlet passage being connectable to a discharge chamber, said inlet and outlet passages having valve means for sequentially introducing pressure fluid to said cylinder through said inlet passage and relieving pressure in said cylinder through said outlet passage thereby causing said plunger to reciprocate, said valve means comprising a motor and a valve driven by said motor.

13. A fluid actuator mechanism comprising a casing having a bore therein closed at one end, an actuator cylinder secured in said bore, said actuator cylinder having a plunger reciprocably mounted therein, said casing having an inlet and an exhaust passage connected to the closed end of said casing bore and communicating with said actuator cylinder, said inlet passage being connectable to a source of pressure fluid, said exhaust passage being connectable to a discharge chamber, said inlet and exhaust passages having valve means for sequentially introducing pressure fluid to said cylinder through said inlet passage and relieving pressure in said cylinder through said exhaust passage thereby causing said plunger to reciprocate, said valve means comprising a motor and a rotary valve driven by said motor.

14. In a fluid actuator mechanism, an alternator adapted to be drivingly connected to a prime mover, a synchronous motor electrically connected to and driven by said alternator, a fluid actuator cylinder having an actuating plunger reciprocably mounted therein, said cylinder having a pressure delivery passage and an exhaust passage connected thereto, said delivery passage being connectable to a source of high pressure fluid, said exhaust passage being connectable to a discharge chamber, primary valve means driven by said synchronous motor for sequentially connecting the delivery passage with said pressure source and the exhaust passage to said discharge chamber whereby the plunger is caused to reciprocate in the actuator cylinder, and secondary valve means metering flow in said delivery and exhaust passages to limit the actuating stroke of said plunger.

15. A fluid pressure actuating device for a spring-biased poppet valve movable between an opened position and a closed position in contact with a valve seat, said device comprising in combination, a cylinder having a plunger reciprocably mounted therein, said plunger being operatively connected to said poppet valve, fluid inlet and outlet passages connected to said cylinder, primary valve means for sequentially introducing pressure fluid to said cylinder through said inlet passage and relieving pressure in said cylinder through said outlet passage thereby reciprocating said poppet valve operating plunger to open and close said poppet valve, fluid flow restricting means in said passages limiting the stroke of said plunger to prevent the overtravel thereof, means associated with said cylinder for causing said poppet valve and said plunger to decelerate before said poppet valve strikes said seat, and secondary valve means for subsequently relieving the remaining pressure in said cylinder to insure the return of the poppet valve to said seat.

16. In a fluid pressure actuating device, an alternator adapted to be drivingly connected to an engine, a synchronous motor electrically connected to and driven by said alternator, a spring biased poppet valve, an actuating cylinder having a plunger reciprocably mounted therein, said plunger being operatively connected to said poppet valve, said cylinder having a pressure delivery passage and an exhaust passage connected thereto, said delivery passage being connectable to a source of pressure fluid, said exhaust passage being connectable to a discharge chamber, said delivery and exhaust passages having balanced rotary valve means drivingly connected to said synchronous motor for sequentially connecting the delivery passage with said pressure source and the exhaust passage to said discharge chamber thereby reciprocating said plunger in said cylinder to open and close said poppet valve, said rotary valve means comprising a casing having a tapered bore therein, a bushing mounted in said bore, said bushing having two pairs of diametrically opposed, longitudinally extending radial slots formed adjacent each end thereof, a pair of said slots at one end being in communication with said delivery passage, the second pair of said slots at said one end being communicable to said pressure source, a third pair of said slots at the opposite end of said bushing being in communication with said exhaust passages and the fourth pair at said opposite end being connected to said discharge chamber, and a valve member rotatably mounted in said bushing and drivingly connected to said synchronous motor, said valve member having a pair of oppositely disposed longitudinally extending grooves formed in each end thereof, said pairs of grooves being circumferentially offset from each other and of sufficient width to form timed fluid connections between the paired slots of said bushing as the valve member is driven by said synchronous motor, and said inlet and exhaust passages having fluid metering means for limiting the poppet valve opening and closing strokes of said plunger.

17. In a fluid actuator mechanism, an alternator adapted be drivingly connected to an engine, a synchronous motor electrically connected to and driven by said alternator, a spring-biased poppet valve, a seat for said poppet valve, an actuator cylinder having a plunger reciprocably mounted therein, said plunger being operatively connected to said poppet valve, fluid inlet and outlet passages connected to one end of said cylinder, and valve means for sequentially introducing pressure fluid through said cylinder and relieving pressure in said cylinder through said outlet passage thereby reciprocating said plunger to open and close said poppet valve, said valve means including a balanced rotary valve drivingly connected to said synchronous motor, secondary valve means in said inlet and outlet passages for limiting the poppet valve operating stroke of said plunger, and a third valve means associated with said outlet passage for insuring the full return stroke of said plunger and thereby the return of the poppet valve to its seat.

18. A fluid pressure actuating device for a spring biased poppet valve movable between an opened position and a closed position in contact with its seat, said actuating device comprising, in combination, an actuating cylinder, a plunger reciprocably mounted therein and operatively connected to said poppet valve, said cylinder having a pressure delivery passage and an exhaust passage connected thereto, said delivery passage being connectable to a source of pressure fluid and said exhaust passage being connectable to a discharge chamber, timed rotary valve means associated with said passages for sequentially connecting the delivery passage to said pressure source and the exhaust passage to said discharge chamber thereby causing said plunger to reciprocate in said cylinder to open and close said poppet valve, fluid flow restricting means in said passage for limiting the stroke of said plunger to prevent the overtravel thereof, means associated with said cylinder for causing said poppet valve and said plunger to decelerate before reaching the extreme limits of their reciprocating movement, and secondary valve means associated with said rotary valve means and controlling said exhaust passage to insure the return of said poppet valve to its seat after said poppet valve and said plunger have been decelerated in a valve-closing direction.

19. A fluid pressure actuating device comprising, in combination, an actuating cylinder connectable to a source of pressure fluid and to a discharge, a plunger reciprocably mounted therein and operably connected to a device to be actuated thereby, timed valve means for sequentially connecting said actuating cylinder to said pressure source and then to said discharge thereby reciprocating said plunger in said cylinder between two limit positions, and controllable fluid flow restricting means for limiting the fluid delivered to and from said cylinder by said valve means to thereby limit the stroke of said plunger to prevent the overtravel thereof and to cause said plunger to decelerate as it approaches the extreme limits of its reciprocating movement.

20. A hydraulic actuator comprising an actuating cylinder, a plunger reciprocably mounted therein and operably connected to a device to be actuated thereby, said cylinder having a delivery passage and an exhaust passage connected thereto, said delivery passage being connectable to a source of pressurized hydraulic fluid, timed valve means for sequentially connecting said cylinder with said pressure source through said delivery passage and then to said exhaust passage, thereby causing said plunger to reciprocate in said cylinder between two extreme limit positions, controllable fluid flow restricting means in one of said passages for controlling the stroke of said plunger in one direction and for causing said plunger to decelerate before said plunger reaches the extreme limit of its reciprocating movement in said one direction, and secondary valve means associated with said first-mentioned valve means for connecting said cylinder to said exhaust passage after said plunger has been decelerated in its reciprocating movement in said one direction to insure full return of said plunger in said one direction to its extreme limit position.

References Cited in the file of this patent

UNITED STATES PATENTS

| 1,298,098 | Rothchild | Mar. 25, 1919 |
| 1,378,093 | Carmody | May 17, 1921 |
| 1,608,770 | Caminez | Nov. 30, 1926 |

FOREIGN PATENTS

| 232,724 | Switzerland | Sept. 16, 1944 |

U. S. DEPARTMENT OF COMMERCE
PATENT OFFICE
CERTIFICATE OF CORRECTION

Patent No. 2,827,884 March 25, 1958

Paul M. Stivender

It is hereby certified that error appears in the printed specification of the above numbered patent requiring correction and that the said Letters Patent should read as corrected below.

Column 1, line 71, for "mounted on" read -- mounted in --; column 3, lines 17 and 56, for "rotaray" read -- rotary --; column 5, line 29, for "received" read -- receiving --; column 11, line 39, after "adapted" insert -- to --.

Signed and sealed this 20th day of May 1958.

(SEAL)
Attest:

KARL H. AXLINE
Attesting Officer

ROBERT C. WATSON
Commissioner of Patents